(No Model.) 3 Sheets—Sheet 1.
A. SCHULZE.
GOVERNOR FOR SEED COTTON HANDLING APPARATUS.
No. 521,676. Patented June 19, 1894.
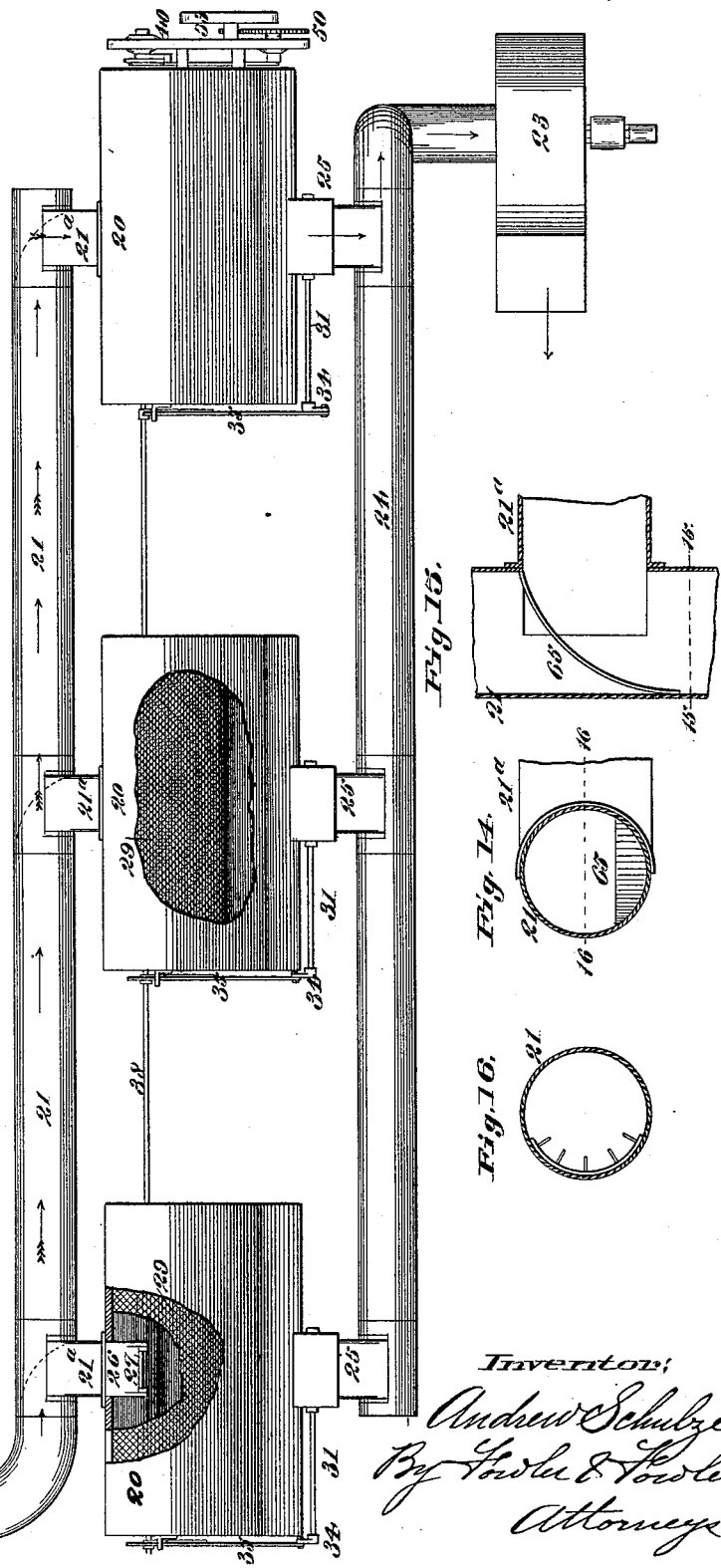

(No Model.) 3 Sheets—Sheet 2.
A. SCHULZE.
GOVERNOR FOR SEED COTTON HANDLING APPARATUS.
No. 521,676. Patented June 19, 1894.
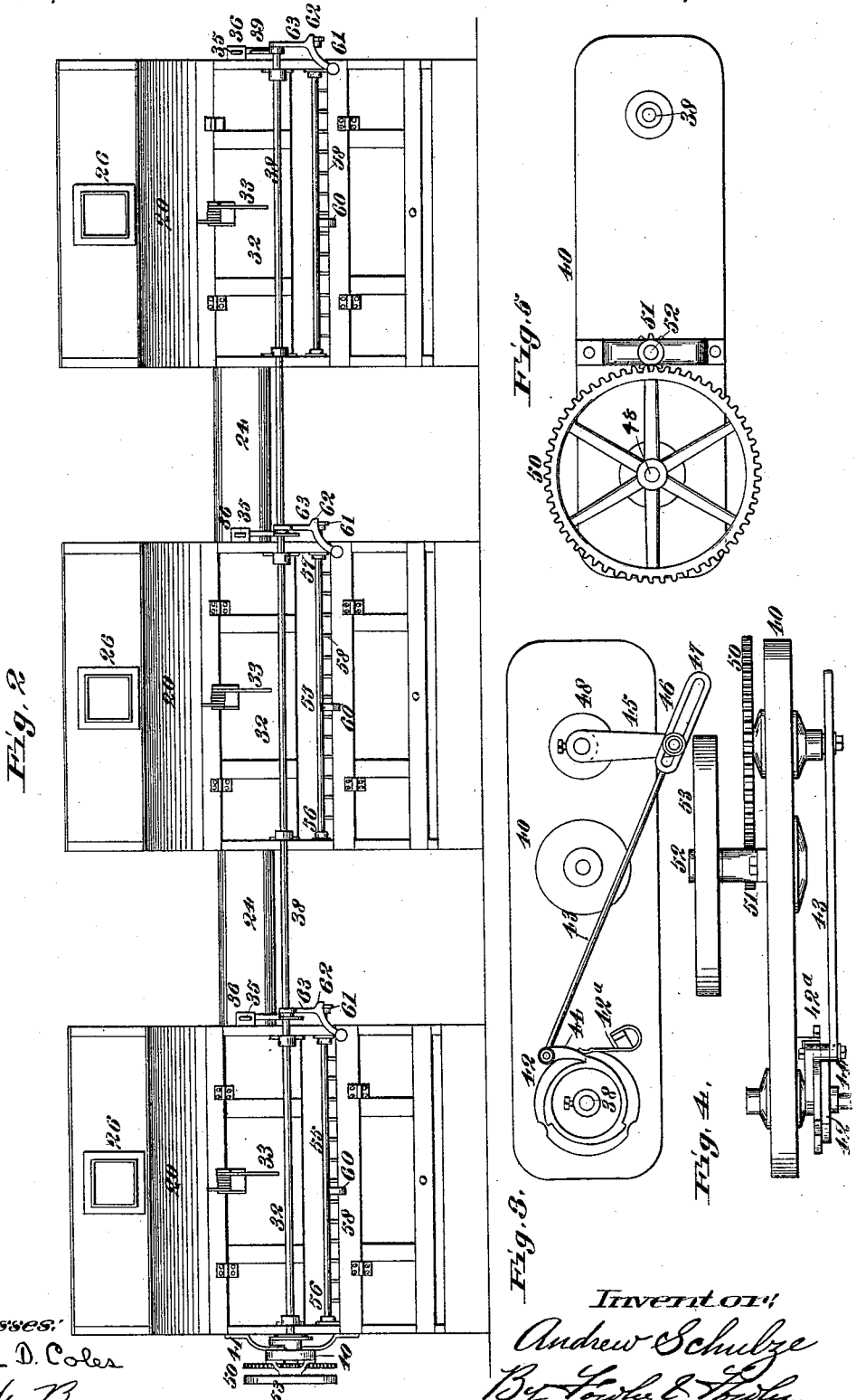
Witnesses:
Walter D. Coles
M. M. Brown
Inventor:
Andrew Schulze
By Fowler & Fowler
Attorneys

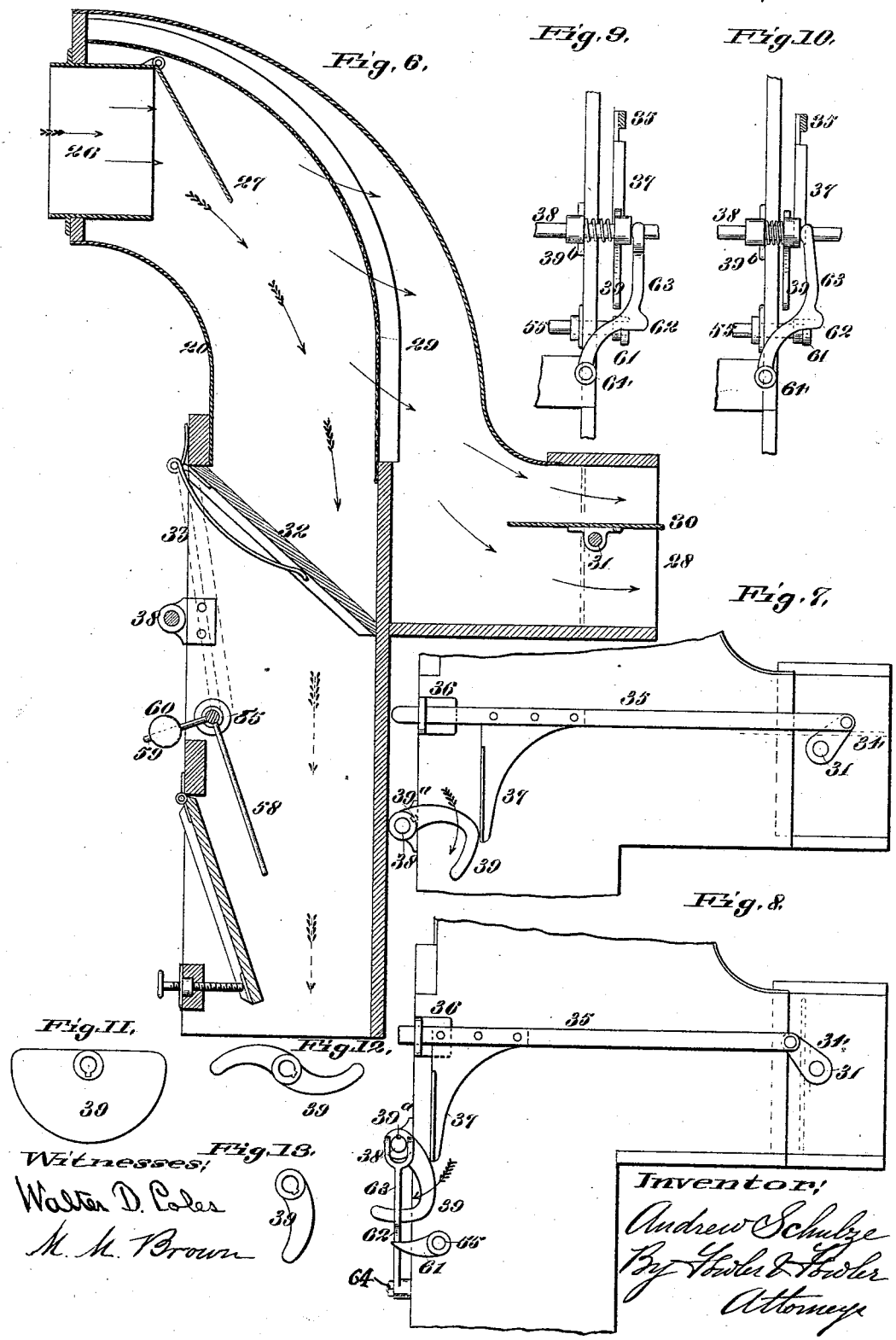

UNITED STATES PATENT OFFICE.

ANDREW SCHULZE, OF LOTT, TEXAS.

GOVERNOR FOR SEED-COTTON-HANDLING APPARATUS.

SPECIFICATION forming part of Letters Patent No. 521,676, dated June 19, 1894.

Application filed May 22, 1893. Serial No. 475,086. (No model.)

*To all whom it may concern:*

Be it known that I, ANDREW SCHULZE, a citizen of the United States, residing at Lott, county of Falls, and State of Texas, have invented a certain new and useful Governor for Seed-Cotton-Handling Apparatus, of which the following is such a full, clear, and exact description as will enable any one skilled in the art to which it appertains to make and use the same, reference being had to the accompanying drawings, forming part of this specification.

My invention relates to a governor for regulating the quantity of seed cotton which is delivered to one or more feeders or gins by a seed-cotton handling apparatus.

The object of my invention is to provide a simple, efficient and reliably operated appliance for controlling the quantity of seed cotton delivered to one or more gins or feeders by a seed-cotton handling apparatus, in such a way that the gin or feeder will receive only the desired quantity of seed-cotton, or so that each gin, where there are a plurality of gins, will receive only its proper portion of the seed-cotton. These objects I accomplish by providing, in conjunction with the receiver of a seed-cotton handling apparatus, appliances which are so adjusted as to cut off the supply of seed-cotton delivered to the gins or feeders by the cotton handling apparatus during part of the time, and only permit the cotton to pass to the feeders or gins at such intervals, and for such periods of time as will be sufficient to deliver the desired quantity of seed-cotton. I may also provide, in conjunction with the appliances aforesaid, devices by means of which the supply of cotton delivered to a gin or feeder will be entirely cut off when more cotton is being delivered thereto than can be ginned, and no additional cotton will be delivered until the surplus is carried away by the feeder or gin.

By the term "receiver" as herein used, I include any receptacle or chamber in which the cotton is deposited or received from a cotton-conveying tube before being fed to a gin or feeder.

Although my governor may be used in any pneumatic cotton-handling apparatus, it is particularly applicable to such an apparatus having the general exterior form described in Letters Patent No. 478,473, issued to me July 5, 1892.

I hereinafter describe one form of my governor employed in conjunction with that form of cotton handling apparatus described in the Letters Patent aforesaid.

My invention will be best understood by reference to the accompanying drawings, in which—

Figure 1 is a top view of a seed-cotton handling apparatus having a series of three receivers, the same being provided with my governor. Fig. 2 is a front elevation of a seed-cotton handling apparatus, having three receivers provided with my governor. Fig. 3 is a side elevation of the appliances for communicating motion to the shaft upon which are placed the cams controlling the supply of cotton delivered to the feeders or gins. Fig. 4 is a top view of the same parts shown in Fig. 3. Fig. 5 is a side view of the appliances for communicating motion to the shaft upon which are placed the cams controlling the supply of cotton delivered to the gins or feeders, looked at from the opposite side to that shown in Fig. 3, the driving pulley being removed. Fig. 6 is a side view in section, of a cotton receiver provided with my governor. Fig. 7 is a side view of a part of the side wall of a receiver, provided with the appliances for opening the valve controlling the draft of air by means of which the seed-cotton is drawn into the receiver, the parts being shown in the position occupied when the valve is open. Fig. 8 is a side view of a part of the side wall of a receiver, with the appliances for opening the valve controlling the draft of air, the valve being closed. Fig. 9 is an end view of appliances for operating the valve controlling the draft of air, together with the device for shifting the cams, the same being shown in its normal position. Fig. 10 is an end view of the same parts shown in Fig. 9, the same being shown out of register with the cam. Figs. 11, 12 and 13 are details showing various forms of cams which may be employed in connection with my governor. Fig. 14 is a transverse section of the supply-pipe or trunk having a deflector therein. Fig. 15 is a longitudinal section of the supply-pipe or trunk, showing the deflector. Fig. 16 is a transverse section of the supply-pipe or trunk provided with a modified form of deflector.

Referring to the drawings, in which the same marks of reference indicate the same parts throughout the several views: 20 is a seed-cotton receiver. The cotton passes into the receivers through the supply-pipe or trunk 21, which communicates with the receivers through the elbows 21ª. The said supply-pipe or trunk communicates with a wagon, bin, or other source of supply of seed-cotton, by means of a telescope or equivalent device which is attached to the end 22 of said trunk 21 (Fig. 1). The cotton is drawn into the receivers by means of a draft of air created by a fan or exhaust device 23, which communicates with the receivers through the pipe 24 and the elbows 25 (Fig. 1). The receiver is provided with an aperture 26, into which pass the elbows 21ª, and through which the cotton enters. The aperture 26 is provided with a hinged check-valve 27 (Fig. 6), the design of said check-valve being to prevent back pressure in the receiver. The receiver is provided also with the aperture 28, into which pass the ends of the elbows 25 communicating with the exhaust-pipe 24. Within the receiver is the wire-screen 29, said screen being interposed between the aperture 26 and the aperture 28, thus permitting the air to move through the receiver in the direction indicated by the unfeathered arrows, while the cotton entering through the aperture 26 cannot pass through the wire screen 29, but will move downward in the receiver in the direction indicated by the feathered arrows. The rear part of the receiver conducting to the aperture 28 is provided with the pivoted valve 30, the said valve being mounted on the shaft 31 (Fig. 6). The valve 30 is formed of a heavy metallic plate, and is attached to the shaft 31 not at its center, but at a point toward its upper end, so that when the shaft 31 is rotated and the valve opened, as shown in Fig. 6, one end of the metallic plate forming said valve will over-balance the other end, causing a tendency for the valve to close again by virtue of gravity, provided the shaft 31 is free to rotate. The receiver is provided at the front thereof, with a hinged door 32 normally closed by the spring 33, the said hinged door being placed below the point at which the exhaust pipe enters the receiver.

It is obvious that when the aperture 26 is in communication with the supply of seed-cotton, and the aperture 28 is in communication with the exhaust or fan 23, seed-cotton will be drawn into the receiver whenever the valve 30 is opened, and the supply of seed-cotton will stop as soon as the valve 30 is closed, thereby cutting off communication between the exhaust or fan 23 and the receiver.

The valve 30 is opened and closed at regular intervals, by means of the appliances hereinafter described. The shaft 31 on which said valve is mounted passes through the casing of the receiver on one side thereof, and has rigidly affixed upon its outer end the arm 34 (Figs. 7 and 8). Pivoted to the outer end of the arm 34 is the shifting rod 35. The shifting rod 35 is supported in a horizontal position by passing through a slot in any suitable bracket 36 secured to the side of the receiver, near the front thereof. Riveted to the shifting rod 35 is the downwardly-projecting arm 37. The arm 37 is thickened upon its front edge in order to form a proper face, against which the revolving cams hereinafter described strike. Extending across the front of the receiver is the shaft 38, which shaft is provided with suitable bearings at the sides of the receiver, in which it is adapted to rotate. Upon the shaft 38, at one side of the receiver, is mounted a cam 39. The cam 39 is so placed with reference to the arm 37 attached to the shifting rod 35, that when the shaft 38 rotates, the cam 39 will be caused to come in contact with the front thickened face of the arm 37, and thus cause the shifting rod 35 to reciprocate. The cam 39 is secured to the shaft 38 by means of the set-screw 39ª, which set-screw extends into a longitudinal slot in the shaft 38 (Figs. 7 and 8). The cam 39 will thus rotate with the shaft 38, but can move longitudinally upon the shaft 38 the length of said slot. A coiled wire spring 39ᵇ surrounds the shaft 38, and is interposed between the cam 39 and the journal at the side of the receiver in which the shaft 38 has its bearing. Thus the cam 39 is normally held in register with the arm 37, but is adapted to be pushed inward toward the receiver 20 and be out of register with said arm 37.

The shaft 38 is caused to rotate by means of the propelling devices shown in Figs. 3, 4 and 5. These propelling devices are attached to the receiver at one side thereof, in any suitable manner. In the drawings I have shown the propelling devices mounted upon a supporting board 40, which is attached to one side of the receiver by suitable brackets 41 (Fig. 2).

The details of the propelling appliances are as follows: The shaft 38 passes through an orifice in the supporting board 40 near one end thereof, and rigidly attached to said shaft 38 is a ratchet-wheel 42. The said ratchet-wheel 42 is rotated by a rod 43 provided with a pawl 44 of ordinary construction. A spring 42ª holds the ratchet-wheel 42 stationary when the pawl 44 is not in engagement therewith. The rod 43 is caused to reciprocate by means of the crank-arm 45 provided, at its outer extremity, with the pin 46, which said pin is secured in a slot 47 formed in one end of the rod 43. The arm 45 is rigidly mounted upon a shaft 48, which shaft is adapted to rotate in a suitable bearing formed in the supporting board 40, and has upon its opposite end a large gear-wheel 50, which said gear-wheel meshes with a pinion 51 mounted upon a shaft 52. Upon the shaft 52 is also mounted the driving or pulley-wheel 53, to which wheel motion is imparted by a belt passing over a suitable pulley fixed upon the driving shaft which propels the gins. As the shaft propelling the gins moves with a very considerable velocity, and as it is desirable that the shaft 38 operating the cams which control the opening and closing of the valve 30, should move slowly, it is necessary that the rate of rotation derived by the propelling pulley 53 from the driving shaft, should be greatly reduced before being communicated to the shaft 38. The propelling appliances shown in Figs. 3, 4 and 5 and just described, are designed to effect this end. The gear wheel 50 being much larger than the pinion 51, it is obvious that the rate of rotation of the arm 45 will be much less than that of the driving pulley 53. Another reduction of speed is accomplished by means of the slot 47 which permits me to utilize the lost motion of the pin 46 while moving the length of the slot 47, for the purpose of increasing the comparative rate of rotation of the ratchet-wheel 42 and the arm 45.

It will be seen that when the shaft 38 carrying the cam 39 hereinbefore described, is caused to rotate by means of the propelling appliances just described, the cam 39 will at each revolution of the shaft 38, be brought in contact with the arm 37 attached to the shifting rod 35 and thus open the valve 30, thereby permitting seed-cotton to be drawn into the receiver 20 while said valve 30 continues open. As soon as the cam 39 rotates out of contact with the arm 37, the gravity of the unequally-balanced valve-plate which forms said valve, will cause the valve 30 to close, and the supply of cotton passing into the receiver 20 will immediately cease. In this way the valve 30 will be alternately opened and closed as the shaft 38 revolves, and the supply of cotton will pass into and be cut off from the receiver as the valve opens and closes.

Although my governing device is adapted to operate in connection with a single receiver, it is also designed to operate in connection with a plurality of receivers. Where it is applied to a series of receivers as shown in Figs. 1 and 2, I preferably use a single propelling appliance which is attached to one of the receivers (Figs. 1 and 2), and I have the rod 38, upon which are placed the cams controlling the valves 30, of sufficient length to extend across the front of all the receivers, the rod 38 being supplied with a proper cam at the side of each receiver.

Where my governor is applied to a plurality of receivers, I so construct the cams 39, and so affix them to the shaft 38 relatively one to another that the valves in one or more of the receivers will always be open, and therefore cotton will be passing from the supply-trunk 21 into one or more of the receivers all the time.

The form of the cams employed for the purpose of opening and closing the valve 30 as hereinbefore described, will be varied to meet the exigencies of the particular case.

Where the governor is attached to a single receiver, I preferably use a cam in the form of a semicircular disk, as shown in Fig. 11. Where this form of cam is used, cotton will be passing into the receiver substantially half the time, and it will be closed against the admission of cotton the other half.

Where my governor is employed in a series of two receivers, I preferably employ the form of cam shown in Fig. 12.

The form of cam shown in Fig. 7 is found peculiarly applicable to a series of three receivers.

Fig. 13 shows the form of cam that may be employed where my governor is attached to a series of receivers comprising any number of gins. In this case the cams, of which one is shown in Fig. 13, are so attached to the shaft 38 relatively to one another that the several valves will be opened and closed in proper order and at proper intervals of time.

While I have pointed out the various forms of cams which I have found most desirable in conjunction with a given series of receivers, I do not wish to limit myself to employing the forms described, the essence of my invention in this respect, consisting in the fact that the cams are made of such form as will be adapted to supply a sufficient quantity, and only a sufficient quantity of seed-cotton to each gin. I may also provide, in conjunction with the appliances aforesaid, a device by means of which the supply of cotton delivered to a gin or feeder will be entirely cut off when more cotton is being delivered thereto than can be ginned.

Transversely across the front of the receiver, below the hinged door 32, extends the rod 55. The rod 55 is mounted in suitable bearings 56 and 57 at either side of the receiver. Extending downwardly and inwardly from the rod 55 is a series of prongs or fingers 58. Extending outwardly from the rod 55 at substantially a right-angle to the prongs 58, is the arm 59 having thereon, near its outer extremity, the weight 60. Normally the weight 60 will gravitate downward until it is stopped by coming in contact with the casing surrounding the receiver, and the prongs or fingers 58 will extend inwardly toward the rear wall of the receiver. The rod 55 extends through the casing of the receiver at one end thereof, and has affixed upon its outer end the shifting-tooth 61. The shifting-tooth 61 is adapted to come in contact with a shoulder 62 formed upon the shifting-arm 63. The shifting-arm 63 is attached near its lower end, by means of a bolt or screw 64, to the casing of the receiver, and has a bifurcated upper end, the bifurcated end surrounding the shaft 38 and being in contact with the cam 39 mounted upon said shaft.

The devices just described operate in the following manner: If more seed-cotton is delivered to the receiver than is being carried away by the feeder or gin, then a considerable quantity of cotton will accumulate in the lower part of the receiver, and the weight of that cotton will be sufficient to press the prongs or fingers 58 downward and outward, and thus cause the rod 55 to rotate, which rotation will produce an upward movement of the shifting-tooth 61. As the shifting-tooth 61 moves upward it will come in contact with the shoulder 62 of the shifting-arm 63, and cause the said arm to move about the bolt 64, its bifurcated upper end operating to press cam 39 inward, the cam 39 being so affixed upon the shaft 38 as to permit it to move longitudinally upon said shaft as hereinbefore described. When thus pushed inward, the cam 39 will be in such a position that it will be out of register with the arm 37, and therefore the rotation of the shaft 38 and the cam 39 will not operate to open the valves 30, and hence no seed-cotton will pass into the receiver 20 while said cam 39 continues out of register with the arm 37. As soon as the accumulated cotton resting upon the prongs 58 is removed by the gins, the weight 60 will gravitate into its normal position, the shifting-tooth 61 will move downward, and the spring 39$^b$ will cause the arm 63 to move outward and the cam 39 will return to its normal position, so that it will come in contact with the arm 37 as it revolves, and the valve 30 will be alternately opened and closed as hereinbefore described.

In order to facilitate the passage of the seed-cotton from the supply-pipe or trunk 21 into the receiver, I place in the supply-pipe 21 the deflectors 65. The deflectors 65 are attached to the bottom of the supply-pipe 21 at the point where the elbows 21$^a$ pass therefrom into the receiver (Figs. 14 and 15). The deflectors 65 are constructed in the form of a segment of a circle, and have one end attached to the supply-pipe 21 near the point where the elbow 21$^a$ enters the supply-pipe, and the other end attached to the outer side of the supply-pipe 21. Fig. 16 shows a modified form of deflector in which I employ a series of spikes projecting from the side of the supply-pipe 21 and pointing in the direction of the elbow 21$^a$ extending to the receiver. The deflectors just described cause the cotton to pass evenly into the several receivers. Where a supply-pipe is employed not having deflectors, there is a tendency of the cotton to pass along the supply-pipe without entering the first receivers and clog up the supply-pipe at its farther end.

The mode of operation of a seed-cotton handling apparatus provided with my governor, is briefly as follows: The seed-cotton from the wagon, bin or other place of deposit, passes into the supply-pipe 21 (Fig. 1), and when the valve 30 of any receiver is opened by means of the appliances hereinbefore described, a draft of air will be created in the direction of the unfeathered arrows (Fig. 6), the swinging-plate 27 will open, and seed-cotton will pass into the upper part of that receiver as indicated by the feathered arrows (Fig. 6). As long as the valve 30 remains open, the suction within the receiver together with the spring 33, will cause the hinged door 32 to remain closed, and the seed-cotton will accumulate upon said door in the upper part of the receiver. As soon as the valve 30 is closed by reason of the cams 39 passing out of engagement with the arm 37, the weight of the cotton will cause the hinged door 32 to swing downward and outward, and the seed-cotton will drop downward in the direction indicated by the dotted arrows (Fig. 6), and be delivered from the lower end of the receiver directly to the feeder or gin, which may be placed underneath. This operation will be continued, and the cotton will continue to be delivered to the feeder or gin as aforesaid. If at any time seed-cotton is delivered into the lower part of the receiver more rapidly than it can be conducted away by the feeder or gin, then the seed-cotton will accumulate therein and cause the cam 39 to be shifted out of register with the arm 37 as hereinbefore described, thus causing the valve 30 to remain closed and cutting off the supply of seed-cotton until the excess is removed.

Having fully described my invention, what I desire to claim and secure by Letters Patent of the United States is—

1. In a seed-cotton handling apparatus provided with pneumatic means for delivering the seed-cotton to a receiver, the combination of a pneumatic cotton conveying tube, a receiver, a valve controlling the passage of cotton into the receiver, and actuating appliances for intermittently operating said valve, the said actuating appliances being operated by an external source of power.

2. In a seed-cotton handling apparatus, the combination with a receiver, of a valve controlling the draft of air by which the seed-cotton is fed into said receiver, actuating appliances for intermittently operating said valve, the said actuating appliances being operated by an external source of power.

3. In a seed-cotton handling apparatus, the combination with a receiver, of a valve controlling the draft of air by which seed-cotton is fed into the receiver, actuating means for operating said valve, a shaft adapted to rotate in suitable bearings and operating said actuating means, whereby said valve will be intermittently opened and closed as said shaft revolves.

4. In a seed-cotton handling apparatus, the combination with a receiver, of a pivoted valve controlling the draft of air by which seed-cotton is fed into the receiver, a shaft having suitable bearings and adapted to be rotated by any proper propelling means, and intermediate mechanism between said shaft and said pivoted valve for intermittently opening said valve.

5. In a seed-cotton handling apparatus, the combination with a receiver, of a valve controlling the draft of air by which seed-cotton is fed into the receiver, a shaft journaled in suitable bearings, a cam mounted upon said shaft, and intermediate mechanism between said cam and said valve for intermittently opening said valve as said cam revolves.

6. In a seed-cotton handling apparatus, the combination with a receiver, of a valve normally closed, a shaft journaled in suitable bearings, a cam mounted upon said shaft, a sliding rod connected with said valve and adapted to come in contact with said cam as it revolves, whereby said valve will be intermittently opened and closed as said shaft revolves.

7. In a seed-cotton handling apparatus, the combination with a receiver, of a valve normally closed, a shaft journaled in suitable bearings, a pulley mounted upon said shaft whereby the same may be rotated, a cam also mounted upon said shaft, and a sliding rod connected with said valve and adapted to come in contact with said cam as said cam revolves, whereby said valve will be intermittently opened and closed as said shaft revolves.

8. In a seed-cotton handling apparatus provided with means for delivering the seed-cotton to a receiver, the combination with the receiver of a pivoted valve controlling the passage of cotton into the receiver, a rod attached at one end to said pivoted valve, and having its other end properly supported, a cam mounted upon a suitably-journaled shaft and adapted to strike against said rod, and propelling devices for rotating said shaft, whereby said valve will be intermittently opened and closed as said shaft revolves.

9. In a seed-cotton handling apparatus provided with means for delivering the seed-cotton to a receiver, the combination with a receiver of a pivoted valve controlling the passage of cotton into said receiver, a rod attached at one end to said pivoted valve, and having its other end properly supported, a cam mounted upon a suitably-journaled shaft and adapted to strike against said rod, a ratchet-wheel also mounted upon said shaft, a ratchet adapted to engage with said ratchet-wheel, a rod for propelling said ratchet, the said rod having a longitudinally slotted end, a pin passing through said slot, a crank-arm, secured to said rod by said pin a shaft upon which said crank-arm is mounted, and a pulley for communicating motion to said shaft bearing said crank-arm.

10. In a seed-cotton handling apparatus the combination with a receiver of a valve controlling the passage of cotton into said receiver actuating appliances for intermittently opening and closing said valve, and automatic means controlled by the cotton accumulating in said receiver for arresting the operation of said actuating appliances and stopping the flow of cotton into the receiver until the accumulated cotton is removed.

11. In a seed-cotton handling apparatus having a valve controlling the passage of cotton into a receiver, the combination with the receiver, of actuating appliances for intermittently opening and closing said valve, and automatic means controlled by the seed-cotton accumulating in said receiver for throwing said actuating appliances out of engagement with said valve so that said valve will not be operated by said actuating appliances until the excess of cotton accumulated in the receiver is removed.

12. In a cotton-handling apparatus the combination of means for delivering seed-cotton to a plurality of receivers, two or more receivers valves controlling the passage of cotton into each of the receivers, actuating devices for intermittently operating said valves, the said actuating devices operating to open said valves in such order relatively to one another that one or more of said valves will be open and one or more closed at any given time.

13. In a cotton-handling apparatus provided with a plurality of receivers, the combination with each receiver of a pivoted valve attached to said receiver and controlling the passage of seed-cotton into the receiver, a shaft journaled in suitable bearings and placed contiguous to said receivers, propelling appliances for rotating said shaft, and intermediate mechanism connecting said shaft to said valves, whereby said valves will be intermittently opened as said shaft revolves.

14. In a cotton-handling apparatus the combination of means for delivering seed-cotton to a plurality of receivers, two or more receivers pivoted valves controlling the passage of cotton into each of the receivers, a shaft journaled in suitable bearings and placed contiguous to said receivers, propelling appliances for rotating said shaft, cams mounted upon said shaft adjacent to each receiver, the said cams having different radial positions upon the shaft, and sliding rods attached to the valves and adapted to come in contact with the cams as they revolve, whereby the several valves will be intermittently opened and closed as said shaft revolves.

In testimony whereof I have hereunto set my hand and affixed my seal, this 20th day of May, 1893, in the presence of the two subscribing witnesses.

ANDREW SCHULZE. [L. S.]

Witnesses:
WALTER D. COLES,
M. M. BROWN.